SUPERVISORY SIGNALING CIRCUITS FOR CARRIER WAVE COMMUNICATION SYSTEMS AND THE LIKE

Filed Sept. 16, 1949 2 SHEETS—SHEET 1

INVENTORS
EVERHARD H.B. BARTELINK.
EDWARD DASKAM, JR.
BY Ward Crosby & Neal.
ATTORNEYS.

INVENTORS
EVERHARD H. B. BARTELINK
EDWARD DASKAM, JR.
BY Ward Crosby & Neal.
ATTORNEYS.

Patented Apr. 29, 1952

2,594,718

UNITED STATES PATENT OFFICE 2,594,718

SUPERVISORY SIGNALING CIRCUITS FOR CARRIER WAVE COMMUNICATION SYSTEMS AND THE LIKE

Everhard H. B. Bartelink, Bronxville, and Edward Daskam, Jr., Franklin Square, N. Y., assignors, by mesne assignments, to Automatic Electric Laboratories, Inc., Chicago, Ill., a corporation of Delaware Application September 16, 1949, Serial No. 116,191

10 Claims. (Cl. 179—84)

This invention pertains to improvements in signaling circuits employed in conjunction with carrier current or radio channels on telephone lines, and also audio frequency telephone circuits which contain amplifiers, for relaying supervision, dialing and ringing current signals over the carrier or radio channels or over the audio frequency amplifier circuits. A primary object of the invention is to provide novel and relatively simple and economical circuit arrangements employing tone signals, for effecting two-way dialing supervision and circuit control over carrier current or radio links or channels interposed in telephone circuit, or over speech frequency amplifier circuits interposed therein, and in such manner as to prevent such tone signals from being transmitted beyond the carrier or radio control terminals or amplifier circuit terminations, and over the metallic terminal circuits to the central offices or subscribers' stations.

The invention is grounded on the concept of employing two distinctive tones of differing frequencies in the upper audio frequency range, for transmitting supervisory, dialing and ringing signals over the channels "east" and "west" respectively of the radio, carrier or amplifier link, in conjunction with which low pass filters are incorporated in the audio frequency, metallic telephone circuits extending respectively from the carrier or radio control or amplifier link terminals to the central offices or subscribers' stations interconnected thereby, these filters having a cut-off sufficiently low to prevent the transmission of the signaling tones aforesaid, to the central office operators or to the subscribers' telephone stations.

Thus, assuming a speech transmission band in the carrier telephone circuits extending up to for example 3000 cycles per second (C. P. S.), the distinctive signaling tones employed might for example have frequencies of 3300 to 3800 C. P. S. respectively, and be employed in conjunction with low pass filters interposed in the metallic circuits, having a cutoff at about 3000 C. P. S.

The present standard techniques employing tone frequencies in the voice frequency range for signaling and supervision over carrier or radio channels interposed in telephone lines, or over four-wire, audio frequency amplifier circuits, in general employ the same tone frequency for transmitting supervisory, dialing and ringing signals in both "east" and "west" directions. Thus to signal from west to east, this tone frequency is impressed on the carrier transmitter at the west carrier or radio terminal, or on the outgoing circuit of a four-wire amplifier circuit, and thus transmitted to east over the carrier, radio or amplifier west-to-east channel, the reverse procedure being employed in transmitting the supervisory signals from east to west over the east-to-west radio, carrier or amplifier channel. It will be understood in this connection that at each of the "west" and "east" carrier or amplifier circuit terminals, the carrier current transmitter and receiver units thereat or the two channels of the four-wire amplifier circuit, are hybrid coupled to a two-wire audio frequency metallic circuit, which extends the connection through one or more central offices to the calling and called subscribers' stations, respectively.

With this conventional arrangement, a rejection filter is inserted, at each carrier terminal, between the carrier transmitter input and the hybrid coil output coupled thereto, in order to prevent any components of the tone signaling frequencies from being transmitted into the metallic circuit extending from the hybrid coil to the subscriber's station. This rejection filter is of course tuned to suppress the tone frequency in the circuit path in question. A similar rejection filter is also interposed at each carrier terminal between the carrier receiver output and the hybrid coil input to which the carrier receiver is coupled. In addition, an acceptance filter which is tuned to pass the tone frequency is connected between the carrier receiver output, and an amplifier-detector combination, which latter operates a receiver signaling relay. With this arrangement the signaling tone impressed on the carrier transmitter at the "west" terminal will be transmitted over the carrier channel to the "east" terminal and will operate the receiver signaling relay thereat, and vice versa for the signaling tone impressed on the carrier transmitter at the "east" terminal, which will operate the receiver signaling relay at the "west" terminal. An equivalent arrangement is employed in the case of four-wire, audio frequency amplifier circuits.

The rejection filters in question serve the additional function of preventing the signaling tone which is impressed for example on the carrier transmitter at the "west" terminal for transmission over the carrier channel going east, from entering the acceptance filter in the output of the "west" carrier receiver, and which is receiving signals from the east terminal, such as might otherwise occur whenever imperfections are present in the hybrid coil balances. Such a direct transmission from the "west" tone oscillator to the "west" receiver signaling relay, if it occurs at a sufficiently high level, might put the "west" receiver signaling relay under direct control of the "west" tone oscillator, rather than under control of the distant or "east" tone oscillator, which should be controlling it.

In accordance with one aspect of the present invention, these sharply tuned rejection filters are completely eliminated, and replaced, at each carrier terminal, by a single low pass filter, interposed between the hybrid coil and the audio frequency metallic circuit extending thereto, in conjunction with which two different tone frequencies are used for supervision in the "east" and "west" directions, both of which tone frequencies are well above the cutoff frequency of the low pass filters in question. The frequency difference between these two tone frequencies is also sufficiently great, that even in the case of serious hybrid unbalances, there is sufficient rejection in the acceptance filter preceding the receiving amplifier-detector-relay combination, to prevent the receiving relay at, for example, the "west" station from being operated by the "west" tone oscillator. In general it is desirable to prevent these supervision tones from entering the subscribers' lines, and it is primarily for this purpose that the low pass filters referred to are interposed between the hybrid coil and the metallic telephone circuit at each carrier or radio terminal.

With the above described two-tone and low pass filter supervisory signaling circuit arrangements of the present invention, the carrier currents are switched on, at all times on the channels "west" and "east" respectively, so that by means of sub carrier methods, the same carrier current or radio link may be employed concurrently for handling a number of telephone channels free from mutual interference as regards transmission of either speech or supervisory signals.

Referring now to the accompanying drawings illustrating the invention:

Figure 1:
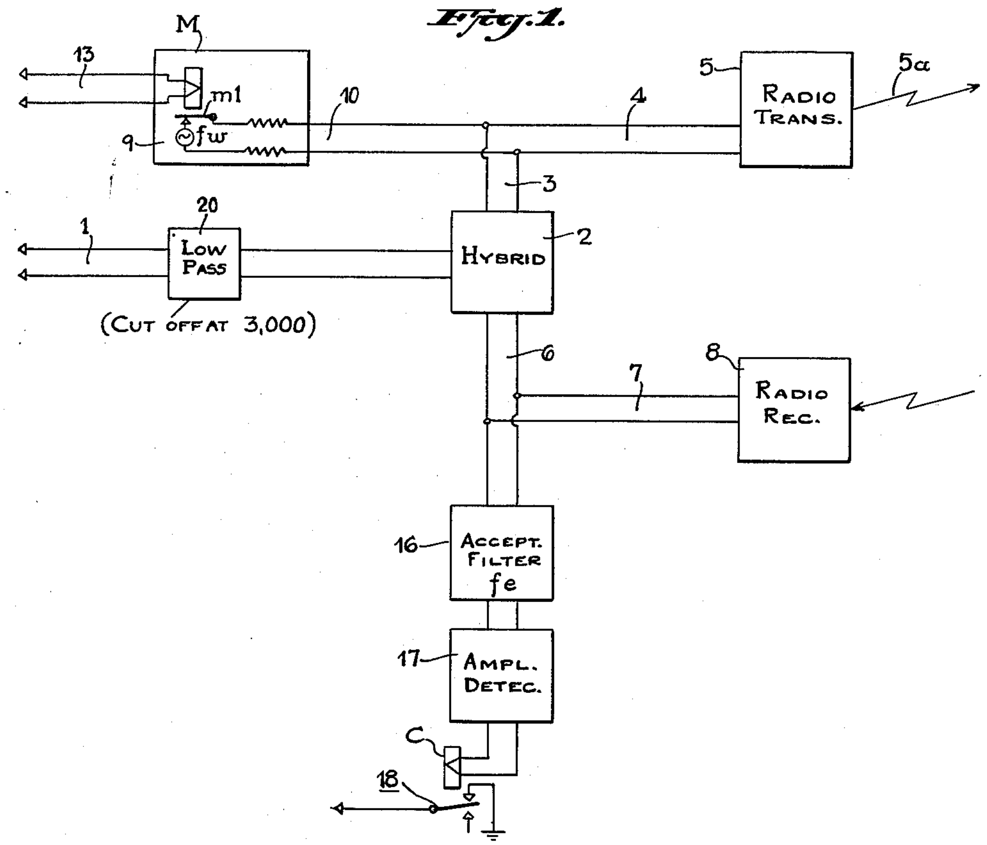
Figure 1 is a diagrammatic circuit layout of a carrier current, radio or four-wire audio frequency link, telephone line termination, incorporating tone frequency supervision signaling and filter circuits in accordance with the invention.

Referring to Fig. 1, there is shown a two-wire, audio frequency, metallic telephone line 1, connected through an hybrid coil 2 and thence over a circuit 3, 4, to the audio frequency input of a carrier current or radio transmitter 5, and also connected over a circuit 6, 7 to the audio frequency output of a carrier current or radio receiver 8. Fig. 1 shows the "west" terminal of a carrier current or radio channel or link interposed in metallic circuit 1, it being understood that the distant or "east" terminal is similarly arranged, and that the description herein applies to either terminal by merely substituting "east" for "west" or vice versa whenever occurring. In the case of a four-wire, audio frequency amplifier circuit, element 5 would represent the transmitting amplifier in the channel "east," while element 8 would represent the receiving amplifier in the channel "west." With this understanding the description will proceed in the assumption that, for illustrative purposes only, elements 5 and 8 designate respectively a radio transmitter and a radio receiver, without necessity for reiterated reference to the fact that carrier speech frequency amplifier circuits may be substituted within the spirit of the invention.

Thus to signal from "west" to "east," a tone frequency $f_w$ is impressed on the carrier transmitter 5 at the "west" terminal and transmitted over the carrier or radio channel 5*a* to "east." This is effected by means of a tone oscillator 9, generating the frequency $f_w$, the output circuit 10 from which is under control of a relay M through the relay contacts $m_1$, the relay in turn being controlled over an energizing circuit 13 in the manner and for purposes explained below. An "acceptance" filter 16 which will accept or pass a tone of a different frequency $f_e$, is connected between the audio frequency output 7 of the radio receiver and the input to an amplifier-detector 17 which operates the receiver signaling relay C during reception by the carrier receiver 8 of carrier modulated by the tone of frequency $f_e$ transmitted thereto from the "east" carrier terminal. Relay C in turn controls a signaling circuit 18 in the manner and for purposes explained below. It should be explained at this point that the tone signaling circuits are shown in the drawing in their normal or "idle" condition in which the supervision tones are continuously transmitted, the M relays in the channels "east" and "west" being released, and the receiver signaling relays C operated.

In general it is desirable to prevent the supervision tones $f_w$ and $f_e$ from being transmitted over the metallic circuits, such as 1, to the central office or subscriber. For this purpose a low pass filter is inserted therein. A single low pass filter accordingly is interposed, as at 20, in the metallic circuit 1 between the hybrid coil 2 and the central office or subscriber's station to which the metallic circuit 1 extends. Filter 20 has a cutoff frequency sufficiently below the tone signaling frequencies $f_w$ and $f_e$ to prevent these tones from entering the metallic circuit 1 while at the same time passing the significant speech components.

Thus, for example, the low pass filter 20 may have a cutoff of about 3000 cycles, in conjunction with which tone signaling frequencies $f_w$ and $f_e$, might for example be 3300 and 3800 C. P. S. respectively, i. e., well above the 3000 C. P. S. cutoff of the filter 20.

Two different tone frequencies, $f_w$ and $f_e$, are employed for supervision in the "east" and "west" directions respectively. In the Fig. 1 showing the oscillator 9 at the "west" terminal has the frequency $f_w$, while the corresponding oscillator at the "east" terminal has the frequency $f_e$. The frequency difference between these two tones is sufficiently great, that even in the event of serious hybrid unbalance, there is sufficient rejection in the acceptance filter 16, which tuned to the frequency $f_e$ received from the "east," to prevent actuation of the amplifier-detector-relay assembly 17, C, by the "west" tone oscillator 9 having the frequency $f_w$.

Figure 2:
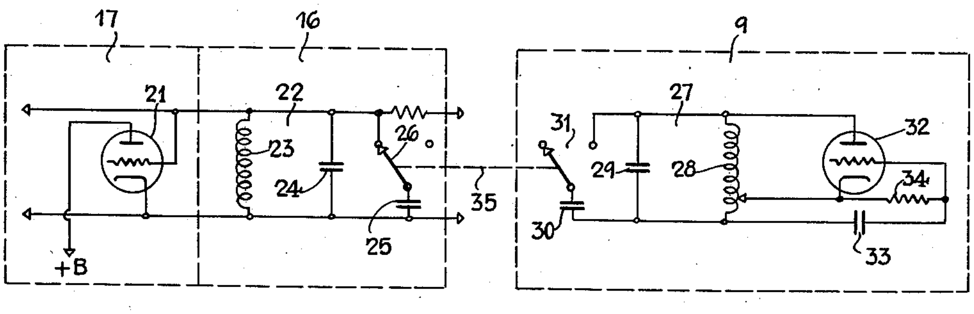
Figure 2 is a fragmentary circuit showing a modification of the Fig. 1 embodiment, comprising a gang switching arrangement for reversing the tone frequencies transmitted and received at the line "east" and "west" terminals, respectively.

Reference will now be had to Fig. 2, which shows a switching arrangement for converting the "west" to "east" operation from tone frequency $f_w$ to $f_e$, and vice versa for "east" to "west" operation. A portion of the tone oscillator circuit 9 of Fig. 1 is shown within the rectangle 9 of Fig. 2. Also the acceptance filter 16 and the amplifier-detector circuit 17 of Fig. 1, is shown within the rectangles 16, 17 respectively of Fig. 2. Referring to Fig. 2, the oscillator 9 includes an electronic tube 32, the output of which contains a tuned circuit 27, comprising an inductance 28, in shunt to a condenser 29. There is also shown a supplemental condenser 30, the latter being connectible in shunt to the tuned circuit 27 through a switch 31. The acceptance filter 16 comprises a tuned circuit 22 consisting of an inductance 23 in shunt to a fixed condenser 24. A supplemental condenser 25 may be bridged across the tuned circuit 22 through a switch 26. The tuned circuit 22 is bridged between the cathode and grid of an amplifier-detector tube 21. The tuned circuit 27 is bridged between the anode and grid of the oscillator tube 32, to the latter through a blocking condenser 33. The cathode is tapped to an intermediate point on coil 28, and is also connected to the grid through a grid-leak resistance 34. The rotary arms of the switches 26 and 31 are ganged together by means of a connecting arm 35.

With the gang switch 35 in the position shown, the tone oscillator 9 is tuned to a tone frequency $f_w$, for example 3800 C. P. S., while the acceptance filter 16 is tuned to the frequency $f_e$ of, for example 3300 C. P. S. By actuating the gang switch 35 to the right these conditions are reversed. That is to say, tone oscillator 9 is tuned to the lower frequency $f_e$ of 3300 C. P. S., while the acceptance filter 16 is tuned to the higher frequency $f_w$ of 3800 C. P. S. This switching arrangement may be incorporated in the "west" and "east" radio or carrier terminals so that the "west" terminal may be arranged to transmit at the higher frequency and to receive at the lower, in which event the "east" terminal would be arranged to transmit at the lower frequency and receive at the higher frequency, or vice versa.

Figure 3:
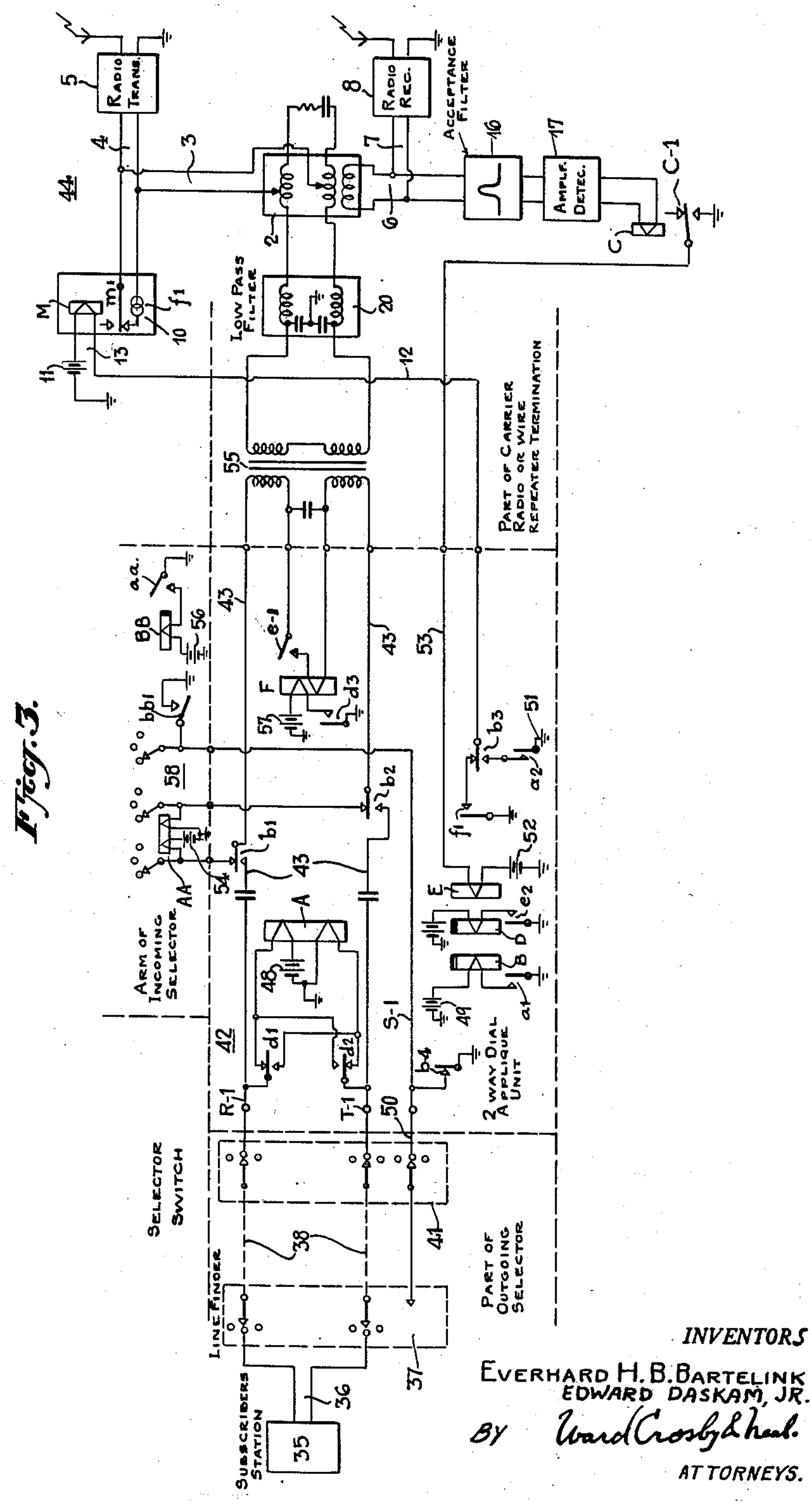
Figure 3 illustrates the Fig. 1 termination and signaling circuit arrangement of the present invention as incorporated in a telephone trunk line extending between automatic telephone exchanges and as arranged for two-way dialing over the trunk line including the carrier or radio channel or four-wire, audio frequency amplifier link interposed therein.

Fig. 3 shows the invention as employed in a trunk line interconnecting automatic exchange central offices, and as arranged for two-way dialing over the trunk. Only sufficient of the automatic exchange equipment will be described to show how the various subscriber actions, when translated into distinctive signals by the dial exchange equipment, are transmitted by the signaling circuit of the invention over a carrier, radio or audio frequency amplifier link interposed in the trunk circuit. The automatic exchange equipment shown is of the step-by-step type, but the same principles are applicable to other types of automatic exchanges.

Referring to Fig. 3, a subscriber's station 35 is connected over a loop 36, to a line finder 37, and is automatically connectible thence over connections 38, and by appropriate dialing operations, through one or more selector switches until it is thus extended to a selector switch 41, to the fixed contacts of which one or more trunk lines, such as 42, is or are connected. Trunk lines 42 extends over a two-wire, audio frequency circuit 43 to a carrier, radio or four-wire audio frequency amplifier circuit terminal in accordance with the present invention and as shown generally at 44. It is to be understood that the distant end of the radio, carrier or amplifier circuit link similarly extends to a termination identical with 44, which is in turn coupled over a metallic circuit corresponding to 43, to a central office trunk termination corresponding to 42. The remaining components of the Fig. 3 showing are best explained by reference to the manner in which the circuit operates.

Thus, assume that the subscriber at station 35 desires to call a distant subscriber reached over a trunk line such as 42. When the subscriber lifts his handset from the switch hook, the line finder 41 automatically finds the calling subscriber's line 36 in the conventional manner of automatic telephone exchange equipment. The line finder will in turn connect the subscriber's loop 36 over connections 38 to a free first selector switch, and subsequent selector switches where applicable, such as 41. As soon as a free first selector switch has thus been seized, dial tone will be transmitted to station 35 to advise the subscriber that the circuit is ready for dialing. Assume, now, that all of the trunk lines, such as 42, extending to the distant exchange through which the called subscriber must be reached, have numbers starting with the digit "3." The subscriber will accordingly dial a "3" as his first digit. This lifts the selector switch 41 to the third level, where it will hunt for a free two-way dial trunk, such as 42, all of which trunks will extend to fixed contacts on the third level of selector switch 41. As soon as a trunk line such as 42 has thus been seized, relay A, normally bridged thereacross through back contacts $d_1$, $d_2$ of a relay D, will operate over a circuit traced from grounded battery 48, thence through the upper winding of relay A, back contacts $d_1$ of relay D, thence over the subscriber's loop and through the subscriber's telephone set, returning over the loop circuit and through back contacts $d_2$, and through the lower winding of relay A to ground. As stated, relay A will operate over this circuit and, through closure of its $a_1$ contacts, will energize the slow release relay B from battery 49, which relay will remain energized during dialing pulses. Relay B, upon energization, closes its contacts $b_4$ to apply ground to a control lead $S_1$, which protects the applique unit against seizure by other calls over a control connection extending therefrom to the outgoing selectors, as at 50.

The operation of relay B also closes its lower contacts $b$–3, thus connecting ground at 51 through contacts $a_2$ of the A relay, to operate the M relay in the "west" tone oscillator circuit, which removes tone of frequency $f_w$ from the radio transmitter 5. The operating circuit for relay M is traced from grounded battery 11 through the winding of the M relay, thence over conductor 12 and through the $b_3$ and $a_2$ contacts of the B and A relays, to ground at 51. Relay M thus operated removes the supervisory signaling tone of frequency $f_w$ transmitted to the distant or "east" carrier receiver, to release the C relay thereat.

The release of relay C at the distant end, in turn operates the E relay thereat, over a circuit traced from grounded battery, such as 52, through the winding of the distant end relay E, and thence over a connection such as 53, to ground through the distant end C relay back contacts $c_1$.

Operation of the distant E relay closes its contacts *e*–1 to operate the AA relay of the incoming selector switch, thereat, over a circuit traced from grounded battery, as at 54, through the lefthand winding of the AA relay, thence through the *b*–1 back contact and armature of the B relay and through the upper winding of an isolating transformer, as at 55, thence through contacts *e*–1 of the E relay and through the lower winding of the relay F, thence through the lower winding of the isolating transformer 55 and through the *b*–2 armature and back contact of the B relay, returning thence to ground through the righthand winding of the AA relay. Relay F does not operate over the current thus supplied through its lower winding. The AA relay, however, operates over the circuit above traced, and in turn energizes the distant BB relay over a circuit traced from grounded battery, as at 56, through the BB relay winding to ground through the *aa* armature and front contact of the AA relay. The resulting operation of the distant end BB relay, applies ground through its *bb*–1 armature and front contact to the distant end control lead S–1. This protects the applique unit thereat against seizure by the distant end outgoing selectors in the manner above explained.

Closure of the *e*–2 contact of the distant end E relay, operates the D relay, but the battery reversal thus effected, through its *d*–1, *d*–2 contacts from the battery thereat corresponding to 48, has no effect, because the distant end applique unit is now protected against seizure by the distant end outgoing selectors in the manner above explained. Operation of the distant end D relay also closes its *d*–3 contact, which in turn closes a circuit from grounded battery, as at 57, through the upper winding of the Fe relay to ground through the *d*–3 contacts of relay D. Relay F will not, however, operate as the current thus supplied through its upper winding is opposed to that supplied through its lower winding, from battery 54, the latter as above stated being insufficient of itself to operate the relay. The distant end M relay remains deenergized thereby continuously to transmit the tone frequency $f_e$ to the near end receiving relay C which thereby remains energized. At the calling end, the operation of the B relay thereat completely removes, through its back contacts $b_1$ and $b_2$, the two-way dial trunk 42 from the arms of the next incoming selector switch 58 thereat.

The circuit is now ready for transmission of subsequent dial pulses by the subscriber at the calling station 35. These dial pulses will operate the A relay at the outgoing end of the trunk, in accordance with dialing interruptions of the current from battery 48 flowing through the A relay windings and over the subscriber's loop. Contacts $a_2$ of this A relay, will transmit these pulses over connection 12 to the M relay of the tone oscillator at the calling end. The M relay will thus follow the dialing pulses and, through its contacts $m_1$, will apply corresponding pulses of the tone frequency $f_w$ to the radio transmitter 5 for modulating the outgoing carrier thereof and transmitting the same to the distant end radio receiver 8. At the distant end, this incoming dial pulse modulated carrier will be received by the distant end radio receiver 8, and upon demodulation thereof, apply the pulses of tone frequency $f_w$ through the acceptance filter 16, to the tuned amplifier and detector 17 thereat, thus to operate the distant end C relay in accordance with the received dial pulses. This dial pulse actuation of the distant end C relay will, through its $c_1$ contacts, correspondingly actuate the distant end E relay, and the resulting dial pulse actuations of the distant end E relay will extend the connection through the distant end automatic telephone exchange incoming selectors, such as 58, to the called subscriber's line, in the manner described below with reference to incoming calls.

When the distant or called subscriber answers by removing his handset from the switch hook, the polarity across the distant end AA relay in the incoming selector thereat, is reversed so that the currents in both windings of the F relay now become aiding, thus to operate the F relay over the circuits above traced. The F relay, on thus operating, operates the distant end M relay over a circuit traced from battery 11, thence through the M relay and over connection 12 through the *b*–3 armature and back contacts of the distance end B relay, which is deenergized, and thence to ground through the *f*–1 front contact and armature of the now energized F relay. The resulting operation of the distant end M relay interrupts the tone of frequency *f* transmitted to the radio receiver 8 at the calling end, thus to release the near end C relay, in turn to operate the near end E relay. Operation of the near end E relay, in turn operates through its $e_2$ contacts, the near end D relay, operation of which in turn reverses the battery from 48 applied to the tip and ring conductors of the calling subscriber's line, by switching the armatures $d_1$, $d_2$ of the D relay from their back to their front contacts. This battery reversal gives reverse battery signaling to the preceding selector switches at the calling end automatic exchange, and thus signals that the called party has answered.

If, at the end of the call, the called party hangs up first, the polarity across relay AA will restore to normal, the current in the windings of relay F will become opposed, and relay F accordingly releases. Through the resulting opening of contacts *f*–1, this releases the distant end M relay. This will restore the tone of frequency $f_e$ transmitted to the near end C relay, which will accordingly operate, in turn to release the near end E relay. Release of the E relay in turn releases relay D, and thus restores the battery polarity on the tip and sleeve conductors of the calling line to normal. When the calling party subsequently hangs up, the near end relay A will release, thereby releasing the near end B relay. Release of these two relays will deenergize the near end M relay, due to opening of its operating circuit at the $a_2$, $b_3$ contacts of the A and B relays. Release of the near end M relay will in turn restore the signaling tone of frequency $f_w$, outgoing to the distant end to reenergize the C relay thereat, and thereby release the E and F relays thereat, in turn to release relays AA and BB. Release of the B relay at the calling end and the BB relay at the called end will remove the ground through their $b_4$ and *bb*–1 contacts from the S–1 leads, at the calling and called ends respectively, and, at the same time, reconnect the trunk through the $b_1$, $b_2$ contacts of the B relay to the incoming selector at the calling end, thus rendering the trunk available for seizure on subsequent incoming or outgoing calls. Thus all circuits are restored to normal.

If on the other hand, at the end of the call, the calling party hangs up first, this will release the near end A and B relays, and thus by opening contacts *a*-2 and *b*-3, restore the supervision tone $f_w$ at the calling end. In addition the B relay reconnects through its $b_1$ and $b_2$ contacts, the returning circuit of the trunk line 42 to the switch arms of the next outgoing selector switch mechanism 41, while removing the ground at its *b*-4 contacts from the S-1 lead. In this switching operation, the AA relay operates over a circuit traced from battery 54 through the $b_1$, $b_2$ back contacts of the B relay, the $e_1$ contacts of the E relay and the lower winding of the F relay. Operation of AA relay in turn operates through its $aa_1$ contacts, the BB relay, the operation of which latter, applies through its $bb_1$ contacts, ground to the control lead S-1, thus protecting the applique unit from the preceding selector switches. It should be borne in mind that during this interval, the near end E relay remains operated, since the tone of frequency $f_e$ is still being suppressed at the called end to release the near end C relay. And the fact that the E relay thus remains operated permits the AA relay to operate as aforesaid through back contacts $b_1$, $b_2$ of the B relay and contacts $e_1$ of the E relay at the near end. When, now, the called party hangs up, this releases the distant end A and B relays, in turn to the distant end M relay, and thus restore the signaling tone of frequency $f_e$ outgoing from the distant end. At the near end, this operates the C relay, in turn to release the near end E relay, which in turn opens its contact $e_1$, thereby releasing the AA and BB relays in the next switching station 58.

On an incoming call, the C relay is released by removal of the tone of frequency $f_e$, received from the distant end. Release of the C relay in turn operates the near end E relay, which closes its contacts $e_1$. This energizes the AA relay in the incoming selector mechanism, and operation of the AA relay, through its contacts $aa_1$, operates relay BB, which latter, through its contacts $bb_1$, applies ground to the control lead S-1. The latter protects the applique unit from seizure by the preceding switches. Contacts $e_2$ of the near end E relay, in turn operates the near end slow release relay D, which closes its contacts $d_3$, thereby energizing the upper winding of the F relay. As was explained above, the AA relay is energized over the circuit traced through the back $b_1$, $b_2$ contacts of the B relay, and through the $e_1$ contacts of the E relay. This current flowing through the lower winding of the F relay is not sufficient to operate it. The polarity of the current flow in lower winding of the F relay is, in this condition, opposed to that in the upper winding, and in consequence of this the F relay does not operate. Under these conditions it is impossible for the near end A and B relays to operate, because the applique unit is protected against seizure by the ground applied at contacts $bb_1$ to the S-1 lead. Thus, the contacts $b_3$ of the B relay, are in the position shown on the drawing, and the near end M relay is accordingly under control of contacts $f_1$ of the F relay. In this condition the distant subscriber can now transmit dial pulses and thus control the operation of the incoming switching trains, such as 58, to select the desired called subscriber. This is accomplished by dial pulse actuation of the near end C relay, which in turn correspondingly actuates the near end E relay.

When the called subscriber answers, this reverses the polarity of current applied by the AA relay, so that the current now flowing in lower winding of the F relay, aids that in the upper winding thereof. The F relay accordingly operates and applies ground through its $f_1$ contacts, to operate the M relay at the called end. Operation of the M relay at the called end, in turn removes signaling tone of frequency $F_w$ to the distant trunk terminal to release the C relay and operate the E and D relays thereat. The latter applies battery reversal through its contacts $d_1$, $d_2$ to the tip and sleeve conductors at the calling end thus advising that the called party has answered. This completes the connection.

During periods that the tone frequencies $f_w$ and $f_e$ are being transmitted and received, the low pass filter 20 prevents these frequencies from being transmitted over the metallic circuit 43 of the trunk, so that they are not heard by the calling or called subscribers.

When the circuit of Fig. 1 is employed for carrier or radio termination on ring down toll lines having a carrier or radio link interposed therein, certain modifications are made in the interconnection of the circuit components. Ringing current is transmitted over the carrier or radio link by short repetitive spurts of the tone frequencies $f_w$ and $f_e$. In this case a polarized M relay is used which is actuated by alternate half cycles of the ringing current, in turn correspondingly to transmit pulses of the tone frequency to the distant end where they correspondingly actuate the C relay, in turn to actuate an appropriate signaling device thereat.

What we claim is:

1. In a communication system: a signal transmitting circuit and a signal receiving circuit, hybrid coupled to a metallic circuit; a low pass filter interposed in said metallic circuit adapted to transmit frequencies within a preselected range; a signal generator having a frequency above said range, and means including a relay for connecting said generator to the input of said signal transmitting circuit; a tuned circuit connected to the output of said signal receiving circuit, said tuned circuit being tuned to a frequency above said range, said tuned circuit being responsive to only a signal received by said receiving circuit which is of a different frequency from that of said signal generator; and a signal translating device connected to the output of said tuned circuit.

2. In a communication system: a two-wire metallic circuit, a hybrid coil, a signal transmitting circuit and a signal receiving circuit; means coupling said metallic circuit through said hybrid coil to said signal transmitting and receiving circuits respectively; a filter interposed in said metallic circuit adapted to transmit frequencies throughout a preselected low frequency range; a signal generator having a frequency above said range, and means including a relay for connecting said generator to said signal transmitting circuit; a tuned circuit bridged across said signal receiving circuit, said tuned circuit being tuned to a frequency above said range, said tuned circuit being responsive to only a signal received by said receiving circuit which is of a different frequency from that of said signal generator; and signal indicating means, including a relay, connected to the output of said tuned circuit.

3. In a communication system: a pair of remotely disposed terminals; a pair of one-way signal transmission circuits extending between said terminals for transmitting signals in opposite directions therebetween, respectively; means hybrid coupling said circuits to a metallic circuit at each terminal; a low pass filter interposed in each said metallic circuit adapted to transmit frequencies within a preselected range; a signal generator at each terminal for generating a frequency above said range, a different frequency for each said generator, and means including a relay for connecting each said generator to the outgoing signal transmission circuit of said pair; a tuned circuit at each terminal connected to the incoming signal transmission circuit of said pair; each said tuned circuit being responsive only to signal at the frequency of the generator disposed at the carrier terminal remote therefrom; and signal indicating means individual to the outputs of said tuned circuits respectively.

4. In a communication system: a pair of remotely disposed terminals, a pair of one-way signal transmission circuits extending between said terminals for transmitting signals in opposite directions therebetween, respectively; means hybrid coupling said circuits to a metallic circuit at each terminal; a low pass filter interposed in each said metallic circuit adapted to transmit frequencies within a preselected range; a signal generator at each terminal for generating a frequency above said range, a different frequency for each said generator, and means including a relay for connecting each said generator to the outgoing signal transmission circuit of said pair; a tuned circuit at each terminal connected to the incoming signal transmission circuit of said pair; each said tuned circuit being responsive only to signals at the frequency of the generator disposed at the carrier terminal remote therefrom; signal indicating means individual to the outputs of said tuned circuits respectively; and switching means at each said terminal for interchanging the frequencies of said generators and the tuning of the tuned circuits thereat.

5. In a carrier current signaling system; a carrier current transmitter and a carrier current receiver, hybrid coupled to a metallic circuit; a low pass filter interposed in said metallic circuit adapted to transmit frequencies within a preselected range; a signal generator having a frequency above said range, and means including a relay for connecting said generator to the input of said carrier transmitter; a tuned circuit connected to the output of said carrier receiver, said circuit being tuned to a frequency above said range, said tuned circuit being responsive to only a signal received by said receiving circuit which is of a different frequency from that of said signal generator; and a signal translating device connected to the output of said tuned circuit.

6. In a carrier current signaling system: a two-wire metallic circuit, a hybrid coil, a carrier current transmitter having a low frequency input, and a carrier current receiver having a low frequency output; means coupling said metallic circuit through said hybrid coil to said carrier transmitter input and to said carrier receiver output; a filter interposed in said metallic circuit adapted to transmit frequencies throughout a preselected low frequency range; a signal generator having a frequency above said range, and means including a relay for connecting said generator to the input of said carrier transmitter; a tuned circuit bridged across said carrier receiver output, said circuit being tuned to a frequency above said range, said turned circuit being responsive to only a signal received by said receiving circuit which is of a different frequency from that of said signal generator; and signal indicating means, including a relay, connected to the output of said turned circuit.

7. In a carrier current telephone system: a carrier current transmitter and a carrier current receiver hybrid coupled to a metallic circuit adapted to transmit audio frequencies; a low pass filter interposed in said metallic circuit adapted to transmit the essential frequencies for articulate speech; a signal generator having a frequency above the cutoff of said low pass filter, and means including a relay for connecting said generator to the input of said carrier transmitter; a tuned circuit connected to the output of said carrier receiver, said circuit being tuned to a frequency above the cutoff of said low pass filter, said turned circuit being responsive to only a signal received by said receiving circuit which is of a different frequency from that of said signal generator; and signal indicating means connected to the output of said tuned circuit.

8. In a carrier current signaling system: a pair of remotely disposed carrier terminals, each including a carrier current transmitter and a carrier current receiver hybrid coupled to a metallic circuit; means for transmitting carrier signals from each carrier transmitter to the remotely disposed carrier receiver; a low pass filter interposed in each said metallic circuit adapted to transmit frequencies within a preselected range; a signal generator at each carrier terminal for generating a frequency above said range, a different frequency for each said generator, and means including a relay for connecting each said generator to the input of the carrier transmitter thereat; a tuned circuit connected to the output of each said carrier receiver, each said circuit being responsive only to signals at the frequency of the generator disposed at the carrier terminal remote therefrom; and signal indicating means individual to the outputs of said tuned circuits respectively.

9. In a carrier current signaling system: a pair of remotely disposed carrier terminals, each including a carrier current transmitter and a carrier current receiver hybrid coupled to a metallic circuit; means for transmitting carrier signals from each carrier transmitter to the remotely disposed carrier receiver; a low pass filter interposed in each said metallic circuit adapted to transmit frequencies within a preselected range; a signal generator at each carrier terminal for generating a frequency above said range, a different frequency for each said generator, and means including a relay for connecting each said generator to the input of the carrier transmitter thereat; a tuned circuit connected to the output of each said carrier receiver, each said circuit being responsive only to signals at the frequency of the generator disposed at the carrier terminal remote therefrom; signal indicating means individual to the outputs of said tuned circuits respectively; and switching means at each carrier terminal for interchanging the frequencies of said generator and said tuned circuit thereat.

10. In a communication system: a signal transmitting circuit and a signal receiving circuit, hybrid coupled to a metallic circuit, a low pass filter interposed in said metallic circuit adapted to transmit signals of a frequency within a preselected range; a signal generator having a frequency above said range, and means for connecting said generator to the input of said signal transmitting circuit; an acceptance filter connected to the output of said signal receiving circuit, said acceptance filter passing signals at a frequency above said range, said acceptance filter being further selective to pass only signals which are different from the frequency of said signal generator; and a signal translating device connected to the output of said acceptance filter.

EVERHARD H. B. BARTELINK.
EDWARD DASKAM, Jr.

REFERENCES CITED

The following references are of record in the file of this patent:

UNITED STATES PATENTS

| Number | Name | Date |
|---|---|---|
| 2,043,417 | Mitchell | June 9, 1936 |
| 2,064,958 | Taylor | Dec. 22, 1936 |
| 2,209,667 | Taylor | July 30, 1940 |